DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 7

T952,005

COATING COMPOSITION COMPRISING PTFE, POLYPHENYLENE SULFIDE AND A POLYSULFONE

Terence Edwin Attwood, Kimpton, and Barry William Farrant, Bristol, England, assignors to Imperial Chemical Industries Limited, London, England

Filed July 14, 1975, Ser. No. 595,754
Claims priority, application United Kingdom, July 23, 1974, 32,496/74
Int. Cl.[2] C08L *27/18*
U.S. Cl. 260—900
No Drawing. 17 Pages Specification

Polymeric coating compositions are described comprised of one or more fluorocarbon polymers, a polyphenylene sulphide polymer and thermoplastic aromatic polysulphones, which when coated onto metal surfaces, such as cookware or the like, provide temperature-resistant, low friction, non-stick surfaces. There are basically 3 types of polymers in the coating compositions described herein: polytetrafluoroethylene is usually the fluorocarbon polymer; the polyphenylene sulphide polymers are usually para-phenylene units linked by sulphide groups, either linear or branched, and generally available in commerce under the trademark Ryton; the thermoplastic aromatic polysulphones represent a class of known polymers comprising repeating units of the formula:

$$—Ar—SO_2—$$

in which Ar is a bivalent aromatic radical which may vary from unit to unit in the polymer chain giving rise to various copolymers. Of this class of materials preference is given to the thermoplastic aromatic polysulphones having a reduced viscosity of at least 0.3 and containing at least 0.2 aromatically bound hydroxyl groups per 100 polymer repeat units.

The polymeric compositions are conveniently applied according to conventional techniques, such as spraying, dipping, brushing and the like, after which the coating is heated to 330–450° C. usually in an oxygen-containing atmosphere within this temperature range and using PTFE as the fluorocarbon polymer, the PTFE is sintered. Suitable substrates include glass, ceramics, ferrous metals such as cast iron, stainless steel, aluminum and various composite surfaces. In addition to providing a non-stick surface for frypans, saucepans, bakeware and the like, other industrial applications will be apparent, like mold lining, rollers, hoppers and the like.

Typical coating compositions include 6–15% by weight of polyphenylene sulphide, 6–15% of the thermoplastic aromatic polysulphone, 3–12% PTFE lubricant powder, a suitable amount of surfactant and optionally up to 10% fillers, balance water.